United States Patent
Young et al.

(10) Patent No.: US 9,238,487 B1
(45) Date of Patent: Jan. 19, 2016

(54) INNER FRONT SIDE MEMBER TO ROCKER SUPPORT REINFORCEMENT GUSSETS FOR VEHICLE FRONT STRUCTURES

(71) Applicant: Toyota Motor Engineering & Manufacturing North America, Inc., Erlanger, KY (US)

(72) Inventors: Jonathan R. Young, Dundee, MI (US); Manikandan BabyMony, Saline, MI (US); Mark C. Kulik, Ann Arbor, MI (US); Behnaz Hajimohsen, Ypsilanti, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 14/532,518

(22) Filed: Nov. 4, 2014

(51) Int. Cl.
*B62D 27/02* (2006.01)
*B62D 25/14* (2006.01)
*B62D 25/20* (2006.01)

(52) U.S. Cl.
CPC ............. *B62D 27/023* (2013.01); *B62D 25/14* (2013.01); *B62D 25/2018* (2013.01); *B62D 25/2036* (2013.01)

(58) Field of Classification Search
CPC ...... B62D 25/025; B62D 25/04; B62D 25/14; B62D 25/20; B62D 25/2009; B62D 25/2018; B62D 20/2036; B62D 20/2045; B62D 27/02; B62D 27/023

USPC .............. 296/29, 187.08, 193.07, 203.01, 296/203.03, 204

See application file for complete search history.

(56) References Cited

U.S. PATENT DOCUMENTS

| | | | |
|---|---|---|---|
| 6,053,564 A | 4/2000 | Kamata et al. | |
| 6,145,923 A | 11/2000 | Masuda | |
| 6,322,134 B1 | 11/2001 | Yang | |
| 6,547,318 B2 * | 4/2003 | Takeuchi | 296/204 |
| 8,276,980 B2 | 10/2012 | Boettcher et al. | |
| 2005/0248185 A1 * | 11/2005 | Hayashi | 296/193.07 |
| 2013/0161981 A1 * | 6/2013 | Mildner | 296/203.02 |
| 2013/0264843 A1 | 10/2013 | Toba | |
| 2014/0001790 A1 * | 1/2014 | Zischke et al. | 296/187.03 |
| 2014/0077529 A1 * | 3/2014 | Kurokawa | 296/193.06 |

FOREIGN PATENT DOCUMENTS

| | | |
|---|---|---|
| JP | 2010163039 | 7/2010 |
| WO | WO2014002890 | 1/2014 |

* cited by examiner

*Primary Examiner* — Jason S Daniels
(74) *Attorney, Agent, or Firm* — Dinsmore & Shohl LLP

(57) ABSTRACT

A vehicle includes a side member that extends in a vehicle longitudinal direction. A dash panel is coupled to the side member and extending in a vehicle lateral direction. A rocker support extends in the vehicle longitudinal direction and is spaced outboard of the side member in the vehicle lateral direction. An A-pillar is coupled to and extends upward from the rocker support. An inner front side member to rocker support reinforcement gusset includes a dash reinforcement portion that is connected to the side member and the dash panel and a floor reinforcement portion that is connected to the rocker support and the side member.

17 Claims, 3 Drawing Sheets

US 9,238,487 B1

INNER FRONT SIDE MEMBER TO ROCKER SUPPORT REINFORCEMENT GUSSETS FOR VEHICLE FRONT STRUCTURES

TECHNICAL FIELD

The present specification generally relates to reinforcement gussets and, more particularly, to inner front side member to rocker support reinforcement gussets for vehicle front structures.

BACKGROUND

Vehicles may be equipped with bumper systems and crash protection structures that plastically deform to absorb energy in the event of a collision. When a vehicle impacts or is impacted by an object that is offset from the centerline of the vehicle such that the object overlaps only a portion of the bumper, the capacity of the energy absorbing structures of the vehicle to absorb energy associated with the impact may be reduced. In some impact configurations, the energy absorbing structures of the vehicle may not be activated or may only be partially activated because the object does not come into contact or only partially comes into contact with associated bumper or vehicle structures. Therefore, the bumper and the energy absorbing structures of the vehicle may have a reduced effect on the dissipation of the energy of the impact. Instead, the energy from the impact may be directed into various vehicle structures, including suspension units of the vehicle.

In one example, a substantial portion of energy from an impact with a small front bumper overlap may be directed into a front wheel, which causes the front wheel to be directed in a generally rearward direction. The energy may be transferred rearwardly along the vehicle as the front wheel contacts vehicle structures proximate to a passenger cabin of the vehicle.

Accordingly, a need exists for alternative structures for transferring energy and absorbing energy from a small front bumper overlap collision.

SUMMARY

In one embodiment, a vehicle includes a side member that extends in a vehicle longitudinal direction. A dash panel is coupled to the side member and extending in a vehicle lateral direction. A rocker support extends in the vehicle longitudinal direction and is spaced outboard of the side member in the vehicle lateral direction. An A-pillar is coupled to and extends upward from the rocker support. An inner front side member to rocker support reinforcement gusset includes a dash reinforcement portion that is connected to the side member and the dash panel and a floor reinforcement portion that is connected to the rocker support and the side member.

In another embodiment, a vehicle comprising a front corner reinforcement assembly includes a side member that extends in a vehicle longitudinal direction. A dash panel is coupled to the side member and extending in a vehicle lateral direction. A rocker support extends in the vehicle longitudinal direction and is spaced outboard of the side member in the vehicle lateral direction. An A-pillar is coupled to and extends upward from the rocker support. An A-pillar reinforcement member includes A-pillar portion connected to the A-pillar and a rocker portion connected to the rocker support to reinforce the A-pillar. An inner dash reinforcement gusset is connected to the dash panel and the side member. An inner front side member to rocker support reinforcement gusset is connected to the side member, the dash panel and the rocker support.

In another embodiment, a vehicle includes a side member that extends in a vehicle longitudinal direction. A dash panel is coupled to the side member and extends in a vehicle lateral direction. A rocker support extends in the vehicle longitudinal direction and is spaced outboard of the side member in the vehicle lateral direction. An A-pillar is coupled to and extends upward from the rocker support. A floor panel extends from the dash panel in the vehicle longitudinal direction and between the rocker support and the side member. An inner front side member to rocker support reinforcement gusset includes a dash reinforcement portion that is connected to the side member and the dash panel. A floor reinforcement portion extends from the dash reinforcement portion in the vehicle longitudinal direction and extends along at least about 25 percent of an area of the floor panel located between the side member and the rocker support up to a floor cross bar support that extends in the vehicle lateral direction and connected to the rocker support.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein are directed to inner front side member to rocker support reinforcement gussets for vehicle front structures. In particular, the inner front side member to rocker support reinforcement gussets may be used to interconnect and reinforce front corners of vehicle compartments including a dash panel, rocker support and front side member. In some embodiments, the inner front side member to rocker support reinforcement gussets may also be connected to a floor panel of the vehicle for reinforcing the floor panel. Absorbing energy and transferring energy among the dash panel, front side member, rocker support, and/or the floor panel may maintain the structural integrity of the cabin of the vehicle and may inhibit intrusion of, for example, the dash panel into the cabin of the vehicle, reinforcement of the front side member and/or shearing of the floor panel, as examples. These and other embodiments will be described in more detail below in reference to the appended drawings.

Figure 1:
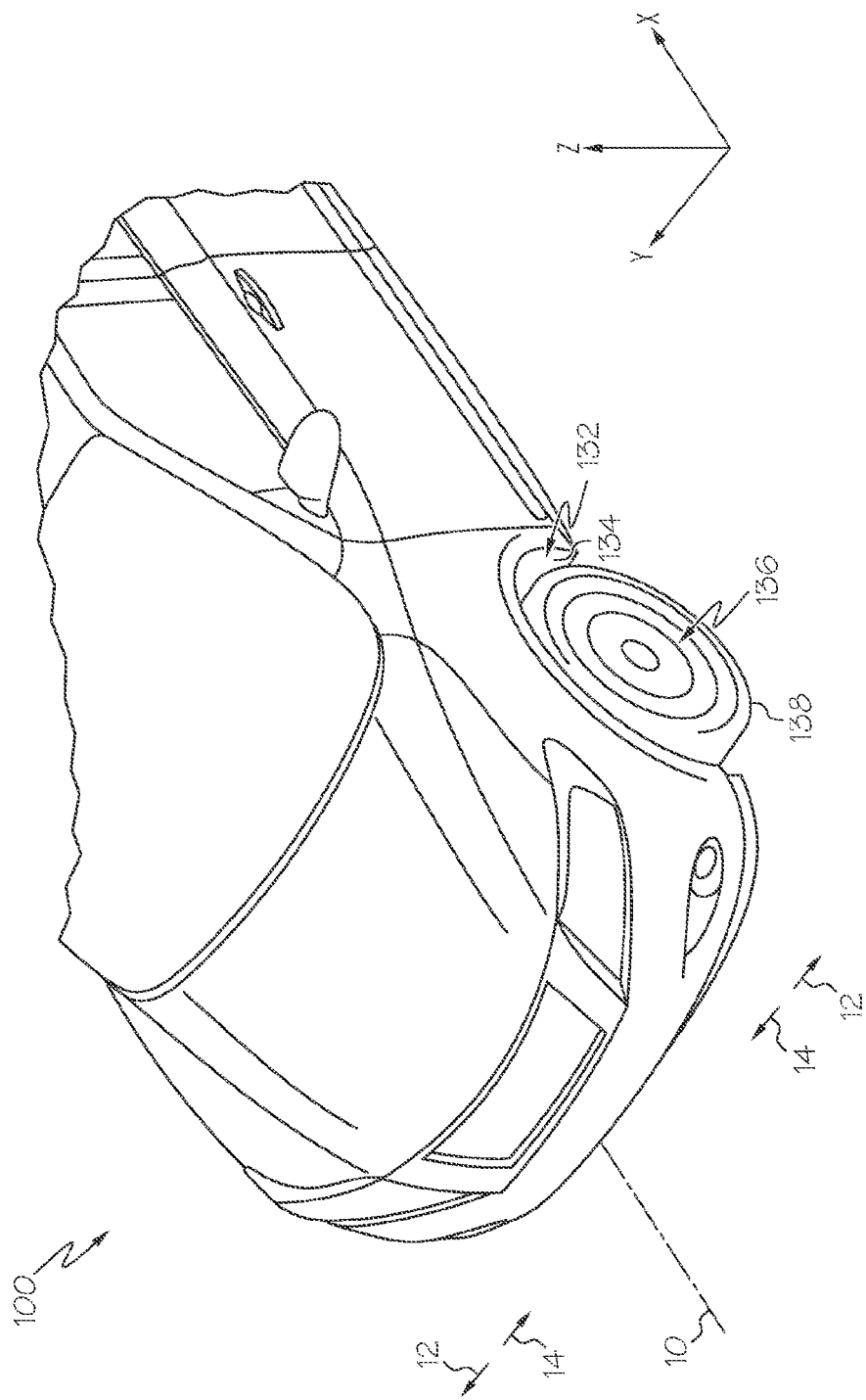
FIG. 1 schematically depicts a perspective view of a vehicle according to one or more embodiments shown or described herein.
Figure 2:
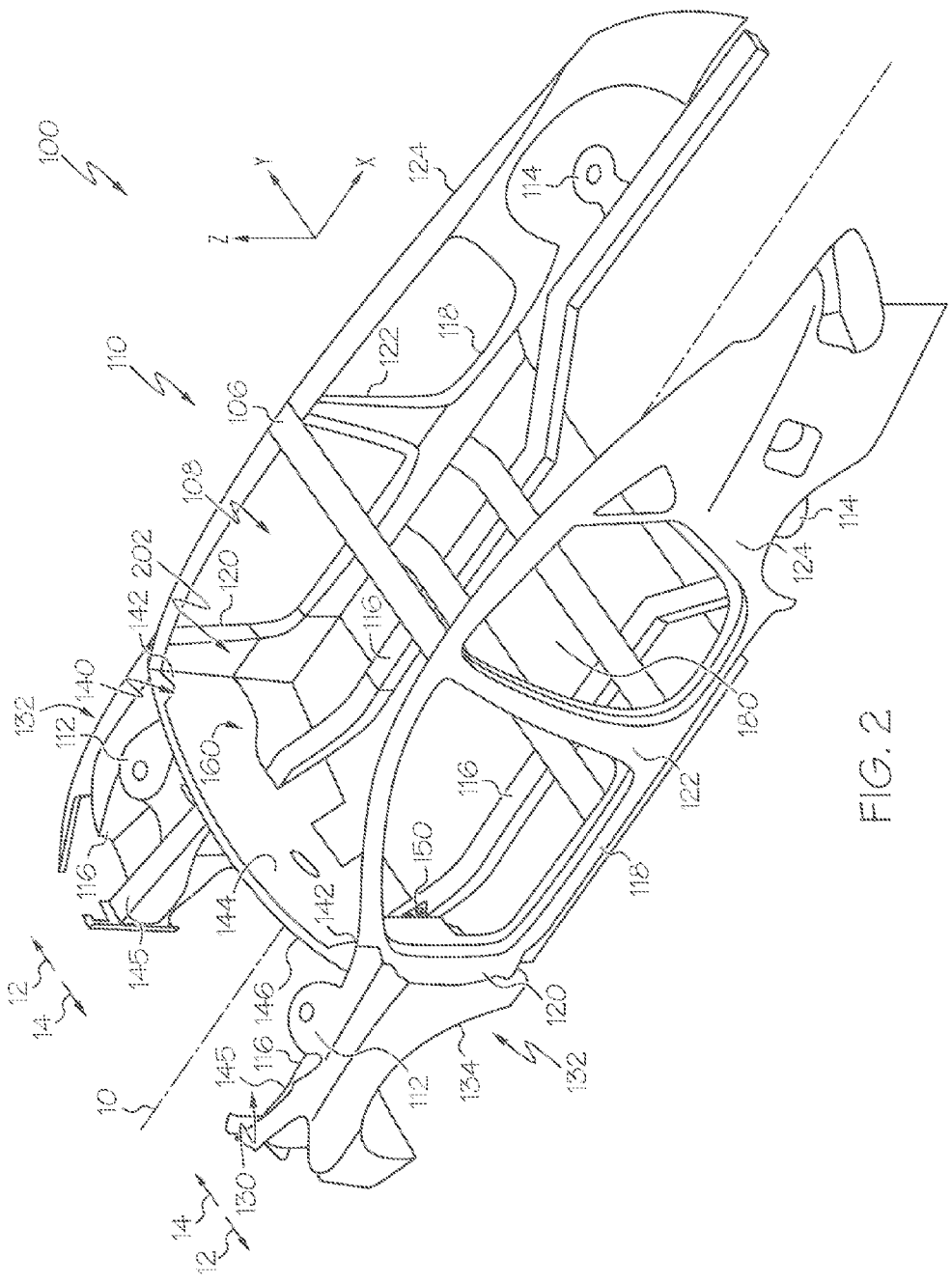
FIG. 2 schematically depicts a perspective view of a vehicle including a dash panel, a rocker support and a side member according to one or more embodiments shown or described herein.

Referring to FIGS. 1 and 2, a vehicle 100 is depicted with certain body panels removed for clarity. The vehicle 100 includes a unibody 110 onto which a vehicle drivetrain is coupled. The unibody 110 includes a pair of front suspension mounts 112 and a pair of rear suspension mounts 114 to which the front suspension units 136 and the rear suspension units (not depicted) of the vehicle 100 are generally attached. The vehicle 100 also includes a cabin 108 that is integral with the unibody 110. The cabin 108 generally defines a passenger cabin of the vehicle 100.

Motor vehicles that incorporate elements according to the present disclosure may include a variety of construction methodologies that are conventionally known, including the unibody construction methodology depicted in FIGS. 1 and 2 as well as a body-on-frame construction methodology. While the embodiments of the present disclosure are described and depicted herein in reference to unibody structures, it should be understood that vehicles that are constructed with body-on-frame construction may incorporate the elements that are shown and described herein.

As used herein, the term "vehicle longitudinal direction" refers to the forward-rearward direction of the vehicle (i.e., in the +/−vehicle X-direction), which corresponds to the direction between the front suspension mounts 112 and the rear suspension mounts. The term "vehicle lateral direction" refers to the cross-vehicle direction of the vehicle (i.e., in the +/−vehicle Y-direction), and is transverse to the vehicle longitudinal direction. Further, the terms "inboard" and "outboard" are used to describe the relative positioning of various components of the vehicle. Referring to FIG. 1, the term "outboard" as used herein refers to the relative location of a component in direction 12 with respect to a vehicle centerline 10. The term "inboard" as used herein refers to the relative location of a component in direction 14 with respect to the vehicle centerline 10. Because the vehicle structures may be generally symmetrical about the vehicle centerline 10, the direction to which use of terms "inboard" and "outboard" refer may be mirrored about the vehicle centerline 10 when evaluating components positioned along opposite sides of the vehicle 100.

Referring to FIG. 2, the unibody 110 includes a pair of side members 116 that are spaced apart from one another in the vehicle in the vehicle lateral direction. The side members 116 extend in the vehicle longitudinal direction. The side members 116 may extend between at least the front suspension mounts 112 and the rear suspension mounts 114 that are positioned rearward of the front suspension mounts 112 in the vehicle longitudinal direction. In some embodiments, the side members 116 may be formed integrally along their length. In other embodiments, the side members 116 may be fabricated from a plurality of vehicle structural components that are coupled to one another as to transfer load. In ordinary vehicle operation, the side members 116 may contribute to overall vehicle stiffness, such that forces introduced to the front suspension units 136 and the rear suspension units of the vehicle 100 can be reacted by the unibody 110. In vehicle embodiments exhibiting unibody construction, the side members 116 may be integral with the unibody 110, such that the side members 116 are incorporated into the cabin 108, for example, by the side members 116 forming a portion of the floor panel 180 of the cabin 108. In other vehicle embodiments, including, for example, vehicle embodiments exhibiting body-on-frame construction, the side members 116 may be separately attached to the cabin 108.

In the depicted embodiments, the front suspension mounts 112 and the rear suspension mounts 114 are coupled to the side members 116. Referring to FIG. 1, a front suspension unit 136 is coupled to the front suspension mount 112. As used herein, the front suspension units 136 may generally include vehicle components that connect the unibody 110 to a wheel 138. These components may include control arms, steering links, and a front chassis member including a spring and a strut. The spring and the strut may be coupled to a knuckle assembly including a hub. A wheel 138 may be coupled to the hub.

Referring again to FIG. 2, the unibody 110 includes a pair of rocker supports 118 that extend in the vehicle longitudinal direction, and are generally parallel to the side members 116 of the unibody 110. The pair of rocker supports 118 may be positioned outboard from the side members 116 of the unibody 110. The rocker supports 118 may be positioned proximate to a lower portion of the door opening of the cabin 108, and rearward of the wheels 138 of the front suspension units 136. The rocker supports 118 may also be positioned proximate to a floor panel 180 of the cabin 108.

The unibody 110 includes an A-pillar 120. The A-pillar 120 may extend generally upward in a vertical direction (i.e., in the +vehicle Z-direction) from the pair of rocker supports 118 to support a side rail 106. The unibody 110 may further include a B-pillar 122 and a C-pillar 124. The A-pillar 120, B-pillar 122, and the C-pillar 124 may be coupled to the rocker supports 118 of the unibody 110.

As used herein, "engine bay" refers to the portion of the vehicle surrounded by the vehicle front quarter panels and forward of a dash panel 140. An engine bay 130 is depicted as being positioned between the pair of side members 116 and forward of the dash panel 140 in the vehicle longitudinal direction. The engine bay 130 is positioned at a generally forward portion of the cabin 108 at a position proximate to the front suspension mounts 112. A vehicle power source, for example, an internal combustion engine, an internal combustion/electric hybrid drive source, or an electric drive source, may be positioned within the engine bay 130. Alternatively, the engine bay 130 may remain generally empty or may include storage space, for example when the vehicle power source of the vehicle is positioned in a rearward portion of the vehicle.

The dash panel 140 extends across the unibody 110 in the vehicle lateral direction. The dash panel 140 also extends upward in the generally vertical direction from the pair of rocker supports 118. In embodiments, the dash panel 140 may be coupled to the rocker supports 118 and the side members 116. A front portion of the side members 116 extending forward of the dash panel 140 may be referred to as front side members 145 and 147. The dash panel 140 includes a cabin-facing side 144 and an engine bay-facing side 146 positioned opposite the cabin-facing side 144. The dash panel 140 also includes a pair of outboard portions 142 that extend upward in the generally vertical direction. The A-pillar 120 may also extend in a generally vertical orientation and along the outboard portions 142 of the dash panel 140 in the vertical direction. The dash panel 140 may be coupled to the A-pillar 120. More specifically, the dash panel 140 may be coupled to the A-pillar 120 at the outboard portions 142 of the dash panel 140. The dash panel 140 may be coupled to the A-pillar 120, the side members 116, and the rocker supports 118 with a variety of attachments including, for example and without limitation, welded joints, brazed joints, mechanical fasteners, and structural adhesives. Because the dash panel 140 extends across the unibody 110 in the vehicle lateral direction and extends upward from the pair of rocker supports 118, the dash panel 140 separates the engine bay 130 from the cabin 108.

A pair of wheel well portions 132 are positioned proximate to the outboard portions 142 of the dash panel 140. The wheel well portions 132 may be positioned forward of the rocker supports 118. The wheel well portions 132 may be positioned outboard of the side members 116 in the vehicle lateral direction. The wheel well portions 132 may extend in an outboard direction to a position generally proximate to the rocker supports 118 in the vehicle lateral direction. The wheel well portions 132 may be formed integrally with the dash panel 140 or, alternatively, may be coupled to the dash panel 140. The wheels 138 (FIG. 1) of the front suspension unit 136 may be generally positioned at least partially within the wheel well portions 132 and forward of the rocker supports 118 in the vehicle longitudinal direction. Additionally, the front suspension units 136 may extend between the front suspension mounts 112 and the wheel well portions 132 and may be positioned at least partially within the wheel well portions 132. The wheel well portions 132 may accommodate portions of the front suspension unit 136 that are coupled to and extend in an outboard direction from the front suspension mount 112 of the unibody 110. The wheel well portions 132 may separate the cabin 108 and the front suspension units 136 that are coupled to the front suspension mounts 112.

The wheel well portions 132 may include fender panels 134 that may have concave portions that face away from the cabin 108 of the unibody 110. The fender panels 134 of the wheel well portions 132 may be shaped to generally accommodate the wheel 138 of the front suspension unit 136 that is coupled to the front suspension mount 112.

Figure 3:
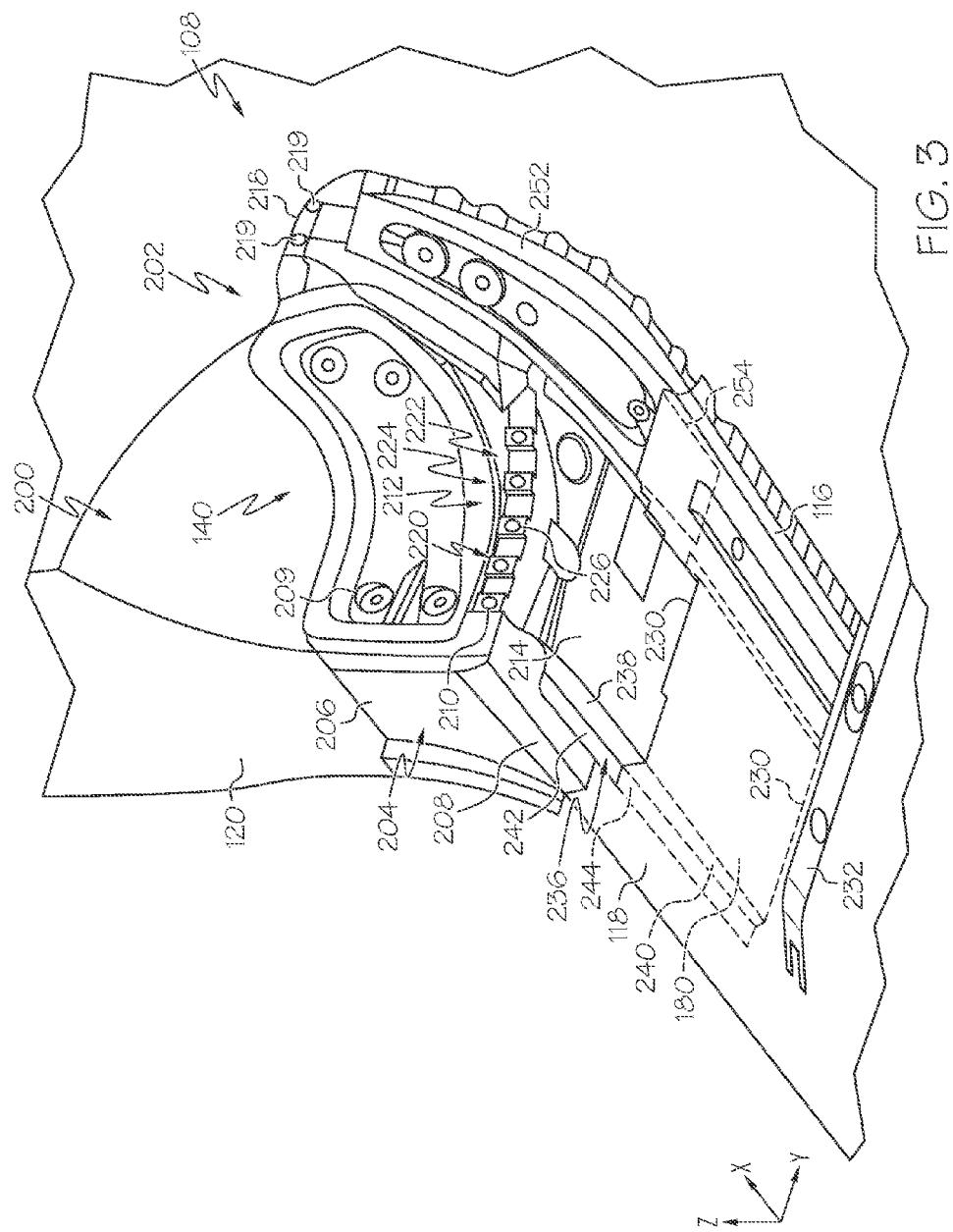
FIG. 3 schematically depicts a top view of a front corner portion of a cabin of the vehicle of FIG. 1 including a front corner reinforcement assembly according to one or more embodiments shown or described herein.

Referring to FIG. 3, a front corner portion 200 of the cabin 108 includes a front corner reinforcement assembly 202. Embodiments according to the present disclosure may include a pair of front corner reinforcement assemblies (front driver and passenger sides). Description of one of the front corner reinforcement assemblies positioned along one side of the vehicle is made herein for clarity; however it should be understood that the description made herein may apply to both front corners of the vehicle. The front corner reinforcement assembly 202 may generally include an inner A-pillar reinforcement member 204 including A-pillar portion 206 that connects to the A-pillar 120 and a rocker portion 208 that connects to the rocker support 118 to reinforce the A-pillar 120. The front corner reinforcement assembly 202 may further include an inner dash reinforcement gusset 209. The inner dash reinforcement gusset 209 may be coupled to the dash panel 140 and the side member 116. The inner dash reinforcement gusset 209 can provide structural reinforcement to the connection between the side member 116 and the dash panel 140, thereby increasing the strength and/or stiffness of the connection between the side member 116 and the dash panel 140.

An inner front side member to rocker support reinforcement gusset 210 is provided that includes a dash reinforcement portion 212 that can be coupled to the front side member 116 and the dash panel 140 and a floor reinforcement portion 214 that extends from the dash reinforcement portion 212 toward and is coupled to the rocker support 118. As can be seen, the reinforcement gusset 210 is somewhat J-shaped having a front edge 216 that extends from a top edge 218 connected to the front side member 145 at connection locations 219 (e.g., welds), downward toward the floor panel 180 and extending alongside the inner dash reinforcement gusset 209 in the vehicle transverse direction. The dash reinforcement portion 212 includes a dash connecting portion 220 in the form of a wall or flange that is shaped to follow the upward extending contour of the dash panel 140. The dash connecting portion 220 may be connected to the dash panel 140 at connection location 226 (e.g., welds) within a series of recessed regions 222 separated by extended regions 224 (which may not be directed connected to the dash panel 140) that extend long the vehicle width direction forming a series of peaks and valleys. In some embodiments, the dash connecting portion 220 may also be connected (e.g., at the connection locations 226) to a torque box (e.g., with the dash panel 140 sandwiched therebetween) that connects the front side member 145 and the rocker support 118 at the vehicle cabin outer side of the dash panel 140.

The floor reinforcement portion 214 extends rearward in the vehicle longitudinal direction, along the floor panel 180 and away from the dash panel 140 thereby extending along at least about 25 percent, such as about 30 percent an area of the floor panel 180 between the rocker support 118 and the side member 116 up to a floor cross bar support 232 that extends in the vehicle lateral direction and is positioned rearward from the dash panel 140 and coupled to the rocker support 118. The floor reinforcement portion 214 has a rear edge 230 that extends in the vehicle lateral direction between the rocker support 118 and the side member 116. In the example shown, the rear edge 230 is located spaced from the cross bar support 232 mounted to the floor panel 180. In other embodiments, the edge 230 may be abutting or located near the cross bar support 232 thereby covering a majority (e.g., 50 percent or more, such as 75 percent or more) of the floor panel 180 between the rocker support 118 and the side member 116. In some embodiments, the floor reinforcement portion 214 may be connected (e.g., welded) to the floor panel 180 at one or more locations. In other embodiments, the floor reinforcement portion 214 may not be directly connected to the floor panel 180 and/or may be spaced vertically from the floor panel 180 at one or more locations.

The floor reinforcement portion 214 further includes a rocker connecting portion 236. The rocker connecting portion 236 may generally follow the contour of the rocker support 118 and includes a vehicle height extending portion 238 that can be connected (e.g., welded) to an inner facing surface 240 of the rocker support 118 and a vehicle width extending portion 242 that can be connected (e.g., welded) to an upward facing surface 244 of the rocker support 118. In other embodiments, the rocker connecting portion 236 may only include the vehicle height extending portion 238. In the illustrated embodiment, the rocker connecting portion 236 is spaced from the dash connecting portion 220 in the vehicle length direction thereby providing a side region 250 of the floor reinforcement portion 214 that may not be directly connected to the rocker support 118. The rocker connecting portion 236 may extend continuously to the edge 230. In other embodiments, the rocker connecting portion 236 may not extend to the edge 230 (i.e., the rocker connecting portion 236 may terminate before reaching the edge 230 and/or the rocker connecting portion 236 may not extend continuously). For example, the rocker connecting portion 236 may include a series of spaced-apart tabs or other connection locations that can be connected to the rocker support 118.

An inner reinforcement frame 252 may have a U-shaped cross section and extend along a length of the side member 116 in the vehicle longitudinal direction. The inner reinforcement frame 252 may include a side member reinforcement connection tab 254 that connects to the side member 116 (e.g., by welding). In some embodiments, the side member reinforcement tab 254 may have a width that is less than a width of the side member 116 in the vehicle lateral direction. In some embodiments where the floor reinforcement portion 214 extends to the bar support 232, the side member reinforcement may extend to the edge 230 and over the side member 116 while connected thereto.

The inner front side member to rocker support reinforcement gusset 210 exhibits an increased buckling resistance of the dash panel 140. Because the reinforcement portion 160 exhibits an increased buckling resistance, the inner front side member to rocker support reinforcement gusset 210 may absorb more energy that is acting to deform and/or translate the wheel well portion 132 and the dash panel 140. By absorbing the energy that is acting to deform and/or translate the wheel well portion 132 and the dash panel 140, the inner front side member to rocker support reinforcement gusset 210 may dissipate the energy at a location forward of the cabin 108 and reduce intrusion of the wheel well portion 132 and the dash panel 140 into the cabin 108. Further, as described hereinabove, by providing the inner front side member to rocker support reinforcement gusset 210, energy may be transferred from the wheel well portion 132 and the dash panel 140 to the side member 116, the rocker support 118, and/or the A-pillar 120. By transferring energy from the wheel well portion 132 and the dash panel 140 to the side member 116, the rocker support 118, and/or the A-pillar 120, the energy that is acting to deform and/or translate the wheel well portion 132 and the dash panel 140 in a generally rearward direction may be dispersed and distributed. By dispersing and distributing the energy that is acting to deform and/or translate the wheel well portion 132 and the dash panel 140 in the generally rearward direction, intrusion of the wheel well portion 132 and the dash panel 140 into the cabin 108 may be reduced.

The above-described inner front side member to rocker support reinforcement gussets can provide a one-piece reinforcement structure used to reinforce corner areas of vehicles. In particular, the inner front side member to rocker support reinforcement gusset can be used to link the dash panel to the front side member to support the toe board at the kick area (where front side member attaches to the body). The inner front side member to rocker support reinforcement gusset may be provided with increased section strength in various areas to reduce buckling. The rocker support can be tied to the front side member to reduce horizontal shearing. The dash panel can also be tied to the front side member to reduce vertical shearing. While welding is discussed primarily above, any suitable connections may be used, such as fasteners, adhesives and combinations thereof.

Directional terms used herein—for example widthwise, lengthwise, vertical, up, down, right, left, front, back, top, bottom, upper, lower—are made only to supply directional context. For example, the terms "extending vertically" or "extending generally vertically" are not meant to exclude a vertically and horizontally extending component.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle comprising:
    a side member that extends in a vehicle longitudinal direction;
    a dash panel coupled to the side member and extending in a vehicle lateral direction;
    a rocker support that extends in the vehicle longitudinal direction and spaced outboard of the side member in the vehicle lateral direction;
    an A-pillar coupled to and extending upward from the rocker support;
    an A-pillar reinforcement member connected to the A-pillar and the rocker support;
    an inner dash reinforcement gusset connected to the dash panel and the side member; and
    an inner front side member to rocker support reinforcement gusset comprising:
        a dash reinforcement portion that is connected to the side member and the dash panel;
        a floor reinforcement portion that is connected to the rocker support and the side member; and
        an inner reinforcement frame connected to the floor reinforcement portion comprising a side member reinforcement connection tab connected to the side member.

2. The vehicle of claim 1, wherein the floor reinforcement portion includes a rocker connecting portion that is connected to the rocker support.

3. The vehicle of claim 2, wherein the rocker connecting portion connected to the rocker support is spaced from the dash panel.

4. The vehicle of claim 1, wherein the dash reinforcement portion is connected to a front side member.

5. The vehicle of claim 1, wherein the floor reinforcement portion is connected to a floor panel.

6. The vehicle of claim 1 further comprising:
    a front suspension mount coupled to the side member; and
    a wheel coupled to the front suspension mount and positioned forward of the dash panel, rocker support and A-pillar.

7. A vehicle comprising a front corner reinforcement assembly, the vehicle comprising:
    a side member that extends in a vehicle longitudinal direction;
    a dash panel coupled to the side member and extending in a vehicle lateral direction;
    a rocker support that extends in the vehicle longitudinal direction and spaced outboard of the side member in the vehicle lateral direction;
    an A-pillar coupled to and extending upward from the rocker support;
    an A-pillar reinforcement member comprising an A-pillar portion connected to the A-pillar and a rocker portion connected to the rocker support to reinforce the A-pillar;
    an inner dash reinforcement gusset connected to the dash panel and the side member;
    an inner front side member to rocker support reinforcement gusset connected to the side member, the dash panel and the rocker support, the inner front side member to rocker support reinforcement gusset comprises a dash reinforcement portion that is connected to the side member and the dash panel and a floor reinforcement portion that is connected to the rocker support and the side member; and
    an inner reinforcement frame connected to the floor reinforcement portion comprising a side member reinforcement connection tab connected to the side member.

8. The vehicle of claim 7, wherein the floor reinforcement portion includes a rocker connecting portion that is connected to the rocker support.

9. The vehicle of claim 8, wherein the rocker connecting portion connected to the rocker support is spaced from the dash panel.

10. The vehicle of claim 7, wherein the dash reinforcement portion is connected to a front side member.

11. The vehicle of claim 7, wherein the floor reinforcement portion is connected to a floor panel.

12. The vehicle of claim 7 further comprising:
a front suspension mount coupled to the side member; and
a wheel coupled to the front suspension mount and positioned forward of the dash panel, rocker support and A-pillar.

13. A vehicle comprising:
a side member that extends in a vehicle longitudinal direction;
a dash panel coupled to the side member and extending in a vehicle lateral direction;
a rocker support that extends in the vehicle longitudinal direction and spaced outboard of the side member in the vehicle lateral direction;
an A-pillar coupled to and extending upward from the rocker support;
a floor panel that extends from the dash panel in the vehicle longitudinal direction and between the rocker support and the side member;
an inner front side member to rocker support reinforcement gusset comprising:
a dash reinforcement portion that is connected to the side member and the dash panel; and
a floor reinforcement portion extending from the dash reinforcement portion in the vehicle longitudinal direction and extending along at least about 25 percent of the floor panel located between the side member and the rocker support up to a floor cross bar support that extends in the vehicle lateral direction and connected to the rocker support; and
an inner reinforcement frame connected to the floor reinforcement portion comprising a side member reinforcement connection tab connected to the side member.

14. The vehicle of claim 13, wherein the floor reinforcement portion is connected to the rocker support and the side member.

15. The vehicle of claim 13, wherein the floor reinforcement portion includes a rocker connecting portion that is connected to the rocker support.

16. The vehicle of claim 15, wherein the rocker connecting portion connected to the rocker support is spaced from the dash panel.

17. The vehicle of claim 13, wherein the dash reinforcement portion is connected to a front side member.

* * * * *

UNITED STATES PATENT AND TRADEMARK OFFICE
CERTIFICATE OF CORRECTION

PATENT NO. : 9,238,487 B1  
APPLICATION NO. : 14/532518  
DATED : January 19, 2016  
INVENTOR(S) : Jonathan R. Young et al.

Page 1 of 1

It is certified that error appears in the above-identified patent and that said Letters Patent is hereby corrected as shown below:

Title Page

In Item: 58, CPC, delete "B62D 20/2036" and insert --B62D 25/2036-- therefor.
In Item: 58, CPC, delete "B62D 20/2045" and insert --B62D 25/2045-- therefor.

Signed and Sealed this
Twelfth Day of April, 2016

Michelle K. Lee
*Director of the United States Patent and Trademark Office*